United States Patent [19]
Wang et al.

[11] Patent Number: 6,008,282
[45] Date of Patent: *Dec. 28, 1999

[54] HIGH IMPACT STYRENE/ACRYLONITRILE POLYMER BLEND COMPOSITIONS

[75] Inventors: Hsien-Chang Wang; Richard Cheng-Ming Yeh, both of Bellaire, Tex.

[73] Assignee: Exxon Chemical Patents, Inc., Baytown, Tex.

[ * ] Notice: This patent is subject to a terminal disclaimer.

[21] Appl. No.: 08/756,470

[22] Filed: Nov. 26, 1996

Related U.S. Application Data

[63] Continuation-in-part of application No. 07/648,267, Jan. 31, 1991, which is a continuation-in-part of application No. 07/563,464, Aug. 7, 1990, abandoned.

[51] Int. Cl.$^6$ .......................................................... C08J 5/36
[52] U.S. Cl. ........................... 524/398; 524/399; 524/434; 524/435
[58] Field of Search ................................. 524/399, 398, 524/434, 435

[56] References Cited

U.S. PATENT DOCUMENTS

| | | | |
|---|---|---|---|
| 3,658,950 | 4/1972 | Eusebi | 260/897 C |
| 4,026,968 | 5/1977 | Johnson et al. | 260/879 |
| 4,143,098 | 3/1979 | Murphy | 260/888 |
| 4,341,884 | 7/1982 | Schepers | 525/211 |
| 4,794,143 | 12/1988 | Ho | 525/196 |
| 5,162,445 | 11/1992 | Powers et al. | 525/333.4 |
| 5,384,299 | 1/1995 | Turner et al. | 502/155 |
| 5,512,638 | 4/1996 | O'Donnell | 525/333.4 |
| 5,543,484 | 8/1996 | Chung et al. | 526/347.1 |
| 5,700,871 | 12/1997 | Arjunan et al. | 525/74 |

FOREIGN PATENT DOCUMENTS

| | | |
|---|---|---|
| 0 076 013A | 4/1983 | European Pat. Off. . |
| WO 92/02582 | 2/1992 | WIPO . |
| WO96/04319 | 2/1996 | WIPO . |

*Primary Examiner*—Peter D. Mulcahy
*Attorney, Agent, or Firm*—Myron B. Kurtzman; Brent M. Peebles; Joseph F. Reidy

[57] ABSTRACT

Styrene/acrylonitrile (SAN) resin compositions are provided having both improved room temperature impact properties as well as good weatherability. The compositions comprise a mixture of SAN resin, an elastomeric halogenated copolymer comprising a $C_2$ to $C_{12}$ monoolefin, e.g. isobutylene, and a ring-substituted alklstyrene, e.g., para-methylstyrene, and a compatibilizing agent such as zinc stearate.

12 Claims, No Drawings

HIGH IMPACT STYRENE/ACRYLONITRILE POLYMER BLEND COMPOSITIONS

This is a continuation-in-part of application Ser. No. 07/648,267, filed Jan. 31, 1991, which is a continuation-in-part of application Ser. No. 07/563,464, filed Aug. 7, 1990, now abandoned.

BACKGROUND OF THE INVENTION

1. Field of the Invention

The invention relates to toughened styrene/acrylonitrile polymer compositions containing a halogenated monoolefin/alkylstyrene copolymer.

2. Description of Related Art

Styrene/acrylonitrile (SAN) copolymers are well known resins having extremely good weatherability (resistance to UV attack) which makes them extremely useful in the production of molded articles for applications such as automotive or marine body parts, packaging and building panels. However, these resins possess relatively poor room temperature impact properties, thereby limiting their use in many such applications requiring good impact strength.

The impact properties of SAN copolymers have been improved by incorporating up to about 20 wt % polymerized butadiene by free radical copolymerization of styrene and acrylonitrile in the presence of dispersed or dissolved polybutadiene to form ABS graft copolymer compositions. The ABS resins exhibit a marked increased in impact properties, but at the cost of diminished weatherability because the residual unsaturation present in the polybutadiene molecular structure is susceptible to U.V. and ozone attack.

Yet another approach in modifying SAN impact properties is to form blends or graft blends of SAN with chlorinated polyethylene, as for example disclosed in U.S. Pat. Nos. 3,658,950, 4,341,884 and 4,794,143. However, these methods incorporate excessive amounts of halogen into the composition which is undesirable in many applications.

SAN properties have also been modified by polymerizing styrene and acrylonitrile in the presence of a $C_4$-$C_7$ isomonoolefin copolymer containing an unsaturated conjugated diene (prepared by dehydrohalogenating halogenated butyl rubber), as for example disclosed in U.S. Pat. No. 4,143,098, or in the presence of a pre-crosslinked bromobutyl rubber, as disclosed in U.S. Pat. No. 4,026,968. However, these resulting compositions containing ethylenically unsaturated components may also be susceptible to U.V. or ozone attack.

SUMMARY OF THE INVENTION

The present invention provides SAN resin compositions having both good room temperature impact properties and enhanced weatherability. These compositions comprise a mixture of:

a) a halogenated elastomeric random copolymer having a saturated or low unsaturation backbone polymer segment and containing aromatic monomer units of the following structure distributed along the polymer backbone chain:

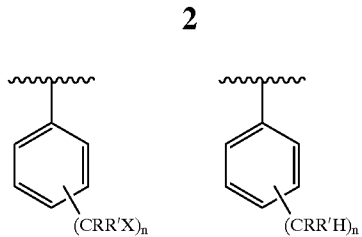

wherein R and R' are independently selected from the group consisting of hydrogen and $C_1$ to $C_4$ alkyl, a X is bromine or chlorine, n is 1–3 and wherein the halogen content of the copolymer is 7 mole % or less and the halogen content of the backbone polymer is 2 mole % or less;

b) a copolymer of styrene and acrylonitrile; and c) from about 0.5 to about 10 parts by weight per 100 parts by weight of the polymer content of the mixture of a compound selected from the group consisting of one or a mixture of aluminum, iron, tin and zinc compounds of a halide or carboxylic acid selected from the group consisting of naphthenic, alicyclic and $C_{10}$ to $C_{28}$ fatty acids, said elastomeric random copolymer present in said composition at a weight ratio of from about 5 to about 80 parts by weight per 100 parts by weight of said styrene/acrylonitrile copolymer.

More preferably, component (a) is a saturated halogenated elastomeric random copolymer having a number average molecular weight of at least 10,000 comprising at least about 80 mole % of polymerized isomonoolefin containing from 4 to 7 carbon atoms and from about 0.05 up to about 20 mole % of para-substituted styrene aromatic monomer units.

DETAILED DESCRIPTION OF THE INVENTION

The halogenation elastomeric copolymers which are useful as blend component (a) are random copolymers comprising at least one $C_2$ to $C_{12}$ monoolefin component and a halogenated alkyl styrene containing from 1–3 alkyl substituent groups which may be positioned at the ortho, meta, para, ortho/meta, ortho/para, meta/para or ortho/meta/para ring positions. Preferred monoolefin components include polymers of ethylene alone or copolymerized with a different $C_3$ to $C_{12}$ monoolefin, e.g., propylene, butene, hexene, octene and the like; polymers of propylene; polymers containing a $C_4$–$C_7$ isomonoolefin as well as terpolymers of ethylene, propylene and a non-conjugated diene such as ethylidene norbornene. Many polymers of this type may be prepared by conventional free radical or transitional metal catalyst systems, such as metallocene catalysts of the type disclosed in U.S. Pat. No. 5,384,299 and PCT publication WO 96/04319. Copolymers containing at least one $C_2$ to $C_{12}$ alpha olefin and a para-alkylstyrene comonomer prepared by metallocene catalysis are disclosed in U.S. Pat. No. 5,543,484, the complete disclosure of which is incorporated herein by reference.

Preferred copolymers are those containing from about 0.5 to 20 mole % of aromatic monomer(s) and less than 5 wt %, preferably less than 2 wt %, of halogen, preferably bromine, and those where n in the formula is 1. Preferably, the alkyl substituent group is positioned at the para ring position.

The most preferred elastomeric copolymers used as a blend component in the present invention are the halogenation product of random copolymers of a $c_4$ to $C_7$ isomonoolefin, such as isobutylene, and para-alkylstyrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene copolymers containing the following monomer units randomly spaced along the polymer chain:

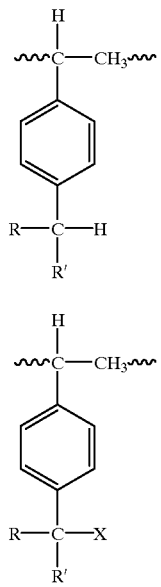

wherein R and R' are independently hydrogen, lower alkyl preferably $C_1$ to $C_4$ alkyl and X is bromine or chlorine, and wherein the copolymer is otherwise substantially free of ring halogen or halogen in the polymer backbone chain. Preferably R and R' are each hydrogen. From about 5 up to about 60 mole % of the para-alkylstyrene present in the copolymer structure may be the halogenated structure (2) above.

Most useful of such preferred materials are elastomeric copolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a narrow molecular weight distribution (Mw/Mn) of less than about 5, more preferably less than about 2.5, a preferred viscosity average molecular weight in the range of from about 100,000 up to about 2,000,000, and a preferred number average molecular weight in the range of from about 10,000 to about 750,000, as determined by Gel Permeation Chromatography.

The copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.1 to about 5 mole % of bromomethyl groups, most of which is monobromomethyl, with less than 0.05 mole % dibromomethyl substituents present in the copolymer. More preferred copolymers contain at least about 0.75 mole % of bromomethyl groups. These polymers, and their method of preparation are more particularly disclosed in U.S. Pat. No. 5,162,445, the complete disclosure of which is incorporated herein by reference.

The SAN component of the blends of this invention are well known materials prepared by well known copolymerization processes. Preferred copolymers exhibit a number average molecular weight in the range of about 50,000 to about 200,000 and contain at least about 50 wt % of copolymerized styrene, more preferably from about 60 to about 80 wt % of copolymerized styrene, and the balance acrylonitrile. The term "styrene" also includes other vinyl aromatic monomers such as alpha-methylstyrene or para-methylstyrene, used alone or in combination with pure styrene. Preferred SAN resins contain about 20–35 wt % of polymerized acrylonitrile.

Preferred blends contain the halogenated elastomeric copolymer at a level of from about 5 to 80 parts by weight, more preferably from about 10 to 50 parts by weight per 100 parts by weight of the SAN resin present in the blend.

Compounds used to promote the compatibility of the halogenated polymer and the SAN component of the composition are carboxylates selected from the group consisting of one or a mixture of aluminum, iron, tin and zinc compounds (salts) of a halide or a carboxylic acid selected from the group consisting of alicyclic, naphthenic, benzoic and $C_{10}$ to $C_{28}$ fatty acids such as stearic and oleic acids. Typical acids include monocarboxylic saturated or unsaturated acids such as capric, lauric, palmitic, stearic and behenic acids as well as their unsaturated analogs such as oleic and ricinoleic acids. The carboxylic acid may also include aromatic acids such as benzoic or naphthenic acids and their derivatives. Zinc stearate is the most preferred of these compounds and the invention is illustrated using this preferred material. The compound may be incorporated in the composition as such or it may be formed in the composition in-situ such as, for example, by the addition of stearic acid and zinc oxide to the composition, followed by the in-situ reaction of these components under conditions of mixing and heat to from zinc stearate. Metal oxides such as zinc or magnesium oxide may also be included in the composition in addition to the carboxylate compounds.

The quantity of the carboxylate compound present in the composition should be sufficient to provide a composition of improved impact strength and compatibility, generally in the range of from about 0.5 to about 10 parts by weight, more preferably from about 1 to about 5 parts by weight, per 100 parts by weight of the total polymer content of the blend composition.

The composition may also contain up to about 30 parts by weight of one or more other elastomeric components such as hydrogenated polybutadiene and/or AB or ABA block copolymers of styrene (A) and polybutadiene (B) or polyisobutylene (B) and/or elastomeric terpolymers of ethylene/propylene and a non-conjugated diene such as ethylidene norbornene.

The compositions of this invention may also contain other conventional additives normally present in molded plastics such as fillers, dyes, plasticizers, antioxidants, UV retarders, fire retardants and like additives.

The blend composition of this invention may be prepared and blended using any suitable mixing device such as an internal mixer (Brabender Plasticorder), a Banbury Mixer, an extruder, a mill mixer, a kneader or a similar mixing device. Preferred blending temperatures and times may range from about 150° C. to 250° C. and from about 1 to 15 minutes respectively. All ingredients, i.e., the polymer components and the zinc stearate, may be combined simultaneously in the mixer or mixed in sequence. Also, a polymer blend may be prepared by polymerizing the styrene and acrylonitrile in the presence of a dispersion containing the halogenated elastomer in organic solvent solution, followed by recovery of the resulting polymer product. This product is then mixed with the carboxylate compound as described above.

The compositions of this invention may be molded, extruded or spun to form shaped articles, e.g., fibers, films, sheets or other shapes useful in automotive, appliance or construction industries.

The following example is illustrative of the invention. The material identified as BR-IPMS is a brominated copolymer of isobutylene and para-methylstyrene having a Mooney Viscosity of 45(ML 1+8, 125°), 7.5 wt % of copolymerized PMS and 1.2 mol. % brominated PMS. The material identified as SAN is a copolymer containing about 72% styrene and 28% acrylonitrile having a melt index of 3.

EXAMPLE 1

A series of resin mixtures having the formulation of Table 1 were prepared by combining the ingredients in a Banbury Mixer for 5 minutes at 230° C., followed by removal of each mixture to a two roll mill where it was cooled. The cooled mixtures were ground to chips in a Pullman Grinder and then injection molded to form test samples for mechanical property evaluation. Results are shown in Table 1.

TABLE 1

| SAMPLE | 1 | 2 | 3 | 4 |
|---|---|---|---|---|
| SAN (wt %) | 100 | 70 | 70 | 70 |
| BR-IPMS (wt %) | — | 30 | 30 | 30 |
| $Zn(St)_2$(PHP)* | — | 2 | 4 | 4 |
| ZnO (PHP) | — | 1 | — | — |
| IRGANOX™ 1076 (PHP)** | — | — | — | 0.2 |
| Notched Izod (R.T) FT/LB/IN | 0.2 | 5.41 | 6.15 | 6.87 |

*parts by wt. per 100 parts by wt. of the polymer content of the blend.
**hindered phenol from Ciba Geigy Corp. - added during injection molding of the test samples.

The improvement in room temperature impact resistance of blend samples 2–4 is obvious in comparison to the unmodified SAN (sample 1). The room temperature impact is also superior to a commercially available ABS material—PA-757—Notched RT.Izod of 2.5, available from CHI-MEI Corp.

EXAMPLES 2–7

Six additional mixtures having the composition described in Table 2 were prepared as in Example 1 by mixing the polymer components on a Danbury mixer at a temperature of about 195° C., followed by addition of the listed additive and continued mixing for about 2–4 minutes. The mixtures were then cooled on a two roll mill and injection molded to form Izod test specimens.

TABLE 2

| | | | ADDITIVE | R.T. IZOD NOT. IMPACT (FT/LB/IN) |
|---|---|---|---|---|
| EX. 2 | SAN (70) | BR-IPMS(30) | $ZnSt_2$(4) | 5.5 |
| EX. 3 | SAN (70) | BR-IPMS(30) | ZnO(4) | 0.48 |
| EX. 4 | SAN (70) | IPMS(30) | $ZnSt_2$(4) | 0.36 |
| EX. 5 | SAN (70) | BR-IPMS(30) | MgO(4) | 0.35 |
| EX. 6 | SAN (70) | Mal. EP (30) | — | 0.43 |
| EX. 7 | SAN (100) | — | — | 0.28 |

The number in parenthesis in Table 2 shows the weight ratio of each ingredient present in the composition. The product of Example 2, within the invention, shows an Izod value of 5.5. The remaining examples are outside the invention. The Control (Example 7) shows an Izod value of 0.28; Examples 3 and 5 where zinc oxide and magnesium oxide respectively are the additives, show very little increase in Izod value. In Example 4, a non-halogenated version of the BR-IPMS copolymer (IPMS) in conjunction with zinc stearate was used, and again a very poor Izod value was achieved. In Example 6, a maleated ethylene/propylene copolymer containing 0.5 wt % grafted maleic acid (Mal. EP) and having a Mooney Viscosity of about 30 (1+4, 125° C.) was used without any additive, and again very little increase in Izod value compared with the control was achieved.

What is claimed is:

1. A thermoplastic polymer composition comprising a mixture of:
   a) a halogenated elastomeric random copolymer having a saturated or low unsaturation backbone polymer segment and containing aromatic monomer units of the following structure distributed along the polymer backbone chain:

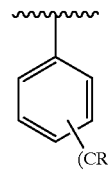 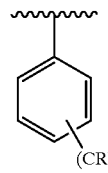

$(CRR'X)_n$  $(CRR'H)_n$ wherein R and R' are independently selected from the group consisting of hydrogen and $C_1$ to $C_4$ alkyl, a X is bromine or chlorine, n is 1–3 and wherein the halogen content of the copolymer is 7 mole % or less and the halogen content of the backbone polymer is 2 mole % or less.
   b) a copolymer of styrene and acrylonitrile; and
   c) from about 0.5 to about 10 parts by weight per 100 parts by weight of the polymer content of the mixture of a compound selected from the group consisting of one or a mixture of:
      aluminum compounds of a halide or a carboxylic acid selected from the group consisting of benzoic, naphthenic, alicyclic and $C_{10}$ to $C_{28}$ fatty acids,
      iron compounds of a halide or a carboxylic acid selected from the group consisting of benzoic, naphthenic, alicyclic and $C_{10}$ to $C_{28}$ fatty acids,
      tin compounds of a halide or a carboxylic acid selected from the group consisting of benzoic, naphthenic, alicyclic and $C_{10}$ to $C_{28}$ fatty acids, and
      zinc compounds of a halide or a carboxylic acid selected from the group consisting of benzoic, naphthenic, alicyclic and $C_{10}$ to $C_{28}$ fatty acids, said elastomeric random copolymer present in said composition at a weight ratio of from about 5 to about 80 parts by weight per 100 parts by weight of said styrene/acrylonitrile copolymer.

2. The composition of claim 1 wherein said backbone is a polymer comprising one or a mixture of $C_2$–$C_{12}$ polymerized mono-olefins and wherein said random copolymer contains from about 0.5 up to 20 mole % of said aromatic monomer units.

3. The composition of claim 1 wherein said compound comprises Zinc Stearate.

4. The composition of claim 1 wherein X is bromine.

5. The composition of claim 1 wherein said halogenated elastomeric random copolymer has a number average molecular weight of at least 10,000 comprising at least about 80 mole % of polymerized isomonoolefin containing from 4 to 7 carbon atoms and from about 0.05 up to about 20 mole % of aromatic monomer units comprising a mixture of the following structures randomly distributed therein:

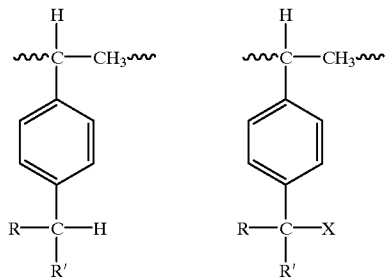

wherein R and R' are independently selected from the group consisting of hydrogen and $C_1$ to $C_4$ alkyl and X is bromine or chlorine.

6. The composition of claim 5 wherein said compatibilizing agent comprises zinc stearate.

7. The composition of claim 5 wherein X is bromine.

8. The composition of claim 5 wherein said halogenated copolymer is a copolymer of isobutylene and para-methylstyrene.

9. The composition of claim 8 wherein from about 5 to about 60% of the para-methylstyrene monomer units contain a mono-bromomethyl group.

10. The composition of claim 9 wherein said copolymer has a bromine content in the range of from about 0.1 to about 5 mole %.

11. The composition of claim 5 containing from about 1 to about 5 parts by weight of zinc stearate per 100 parts by weight of the polymer content of said composition.

12. The composition of claim 1 containing from about 10 to 50 parts by weight of said elastomeric random copolymer per 100 parts by weight of said styrene/acrylonitrile polymer.

* * * * *